Patented Oct. 13, 1953

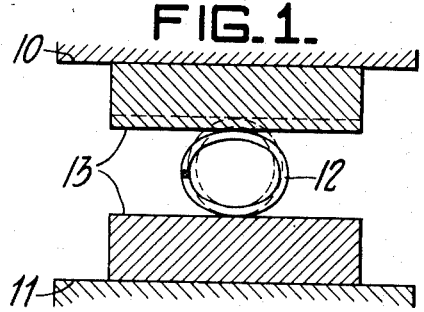
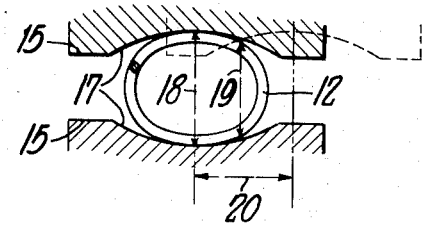
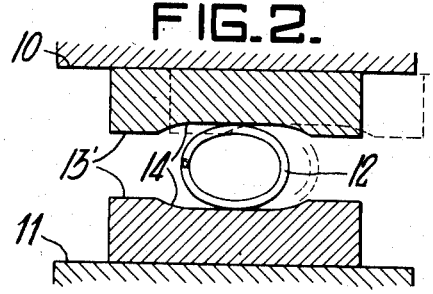
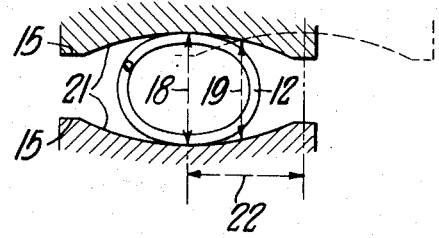
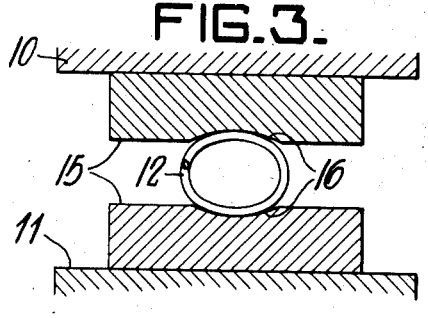
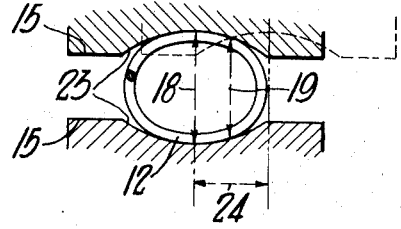
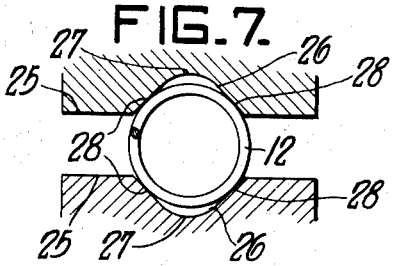
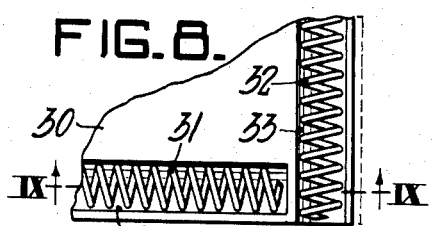
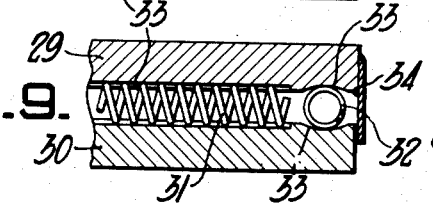

2,655,370

UNITED STATES PATENT OFFICE 2,655,370

RESILIENT CUSHION UTILIZING SIDE-LOADED HELICAL SPRINGS

Arthur R. Schulze, Youngstown, Ohio, assignor to United States Steel Corporation, a corporation of New Jersey Original application January 25, 1949, Serial No. 72,682, now Patent No. 2,525,730, dated October 10, 1950. Divided and this application September 6, 1950, Serial No. 183,348

2 Claims. (Cl. 267—1)

This invention relates to a resilient cushion of high capacity at small deflections for general application and, in particular, to a shock-absorbing mounting or cushion which employs a coil spring or springs subjected to side loading.

This application is a division of my application Serial No. 72,682, filed January 25, 1949, which has issued as Patent No. 2,525,730, granted October 10, 1950.

Metal springs of several types are widely used for resiliently supporting heavy loads and cushioning impact, e. g., axially loaded coil springs, leaf springs and torsion springs. Since the force exerted by a spring is proportional to its unit deflection, it is not difficult to make springs for heavy loads where large deflections are permissible. When the deflection is limited to the order of a fraction of an inch, however, conventional springs must be of large size and weight to support heavy loads and their cost is correspondingly great. As a result, other material such as wood padding or blocking, pads of rubber or laminated fabric impregnated with rubber, or a plurality of thin metal sheets indented or embossed, have come into use as resilient cushions. Such materials, however, lack the durability of conventional springs.

I have invented a resilient cushion for supporting heavy loads at small deflections which overcomes the aforementioned objections by utilizing helical springs in a novel manner, i. e., by subjecting them to side loading instead of axial loading. The resistance of a helical spring to deflection under side loading is higher than its resistance under axial loading and is proportional to the number of turns of the helix so that it may easily be made sufficient to carry very heavy loads without exceeding reasonable limits of size or weight. When a helical spring is loaded axially, its capacity is the force required fully to deflect a single turn. Increasing the turns increases the permissible deflection but not the capacity. The converse is true, however, in the case of side loading since each turn carries its share of the load independently of the other turns. I take advantage of this fact to provide a high-capacity spring mounting for loads requiring only small deflections. Under side loading, each 180°-arc of the helix between the diametrically opposite points of load application and support acts as a separate spring of the bow type and a large capacity is thus obtainable with a relatively small spring. For example, a spring 2″ long composed of 5 turns of $\frac{5}{32}$″ steel wire wound in a helix 1⅝″ outside diameter, is compressed to solid condition (i. e., a deflection of 1⅛″) under an axial load of 87 pounds but will sustain a laterally applied load of 4500 pounds with a deflection of only ⅛″.

My improved resilient cushion has peculiar advantages for installations where lateral movement of the load relative to the support is desirable or necessary. To this end, I mount the spring in the manner of a bearing roller. The surfaces of the load and support in contact with the spring may be plane when such movement is considerable but preferably have grooves serving as seats for the sides of the spring. When only limited lateral movement is required, the grooves may be flat-bottomed but where it is desirable that the load resist lateral movement or be self-centering, i. e., that it return to a normal position after lateral displacement, the grooves should have a section which is an arc of a circle or other curve. Where lateral movement of the load is unnecessary, the supporting springs may be arranged at an angle to each other. The spring seating grooves, furthermore may be shaped so that each engages the spring at a pair of spaced points instead of at the bottom of the groove only. This increases the load capacity for a given deflection.

A complete understanding of the invention may be obtained from the following detailed description and explanation which refer to the accompanying drawings illustrating an elementary embodiment and modifications thereof. In the drawings, Figure 1 is a transverse vertical section through a resilient cushion according to the invention;

Figures 2 and 3 are views similar to Figure 1 showing modifications;

Figures 4, 5 and 6 are comparative views similar to Figure 3 showing the effect of varying the curvature of the seating grooves;

Figure 7 is a view similar to Figure 1 showing a further modification;

Figure 8 is a partial plan view of a resilient cushion employing side-loaded springs disposed at an angle to each other, the load-applying member being omitted for clearness; and Figure 9 is a partial section taken on line IX—IX of Figure 8.

Referring in detail to the drawings and for the present to Figure 1, a load-applying member 10 is carried on a supporting member 11 by means of a helical spring 12 disposed on its side therebetween. The members 10 and 11 preferably have bearing members 13 formed thereon or separately formed and secured thereto which engage the turns of the spring tangentially at substantially diametrically opposite points. It will be evident that the deformation of the coil turns from their original circular condition indicated in dotted lines to the deflected condition shown in solid lines will vary with the applied load and that each half of each turn on opposite sides of the vertical center line acts individually as a bow-spring. It will also be evident that lateral or horizontal movement of the load relative to the support is unrestricted. Such movement, of course, is accompanied by rolling of the spring between the surfaces 13 in the manner of a bearing roller. While the portions of the turns which are stressed vary with lateral movement, the degree of deformation varies only with the vertical load. For the purpose of illustration, the deformation has been shown to a considerably exaggerated degree in the drawings.

Figure 2 shows a slight modification in which members 13' have seating grooves 14 formed in their opposed faces, the bottoms of the grooves having tangential engagement with the turns of the helical spring 12. The bottoms of the grooves 14 are flat in the mid-portion thereof and thus permit considerable free lateral movement of the load relative to the support. The sides of the grooves are on a slope. The degree of such movement, however, is limited to one-half the width of the flat bottom of the grooves as indicated by the chain line position of the upper bearing surface 14.

Figure 3 shows a further modification in which bearing members 15 have seating grooves 16 in their opposed surfaces for receiving the spring 12. A section through the grooves is a circular arc of radius greater than that of the spring. This construction permits limited lateral movement of the load but such movement is resisted by the spring because it requires deformation thereof. As a result, there is a constant tendency to restore the load to centered position relative to the support. The form of cushion shown in Figure 3, therefore, differs from those shown in Figures 1 and 2. Lateral movement of the load in Figure 1 causes no deformation of the spring while the grooves 14 of Figure 2 permit limited lateral movement without deformation of the spring until it engages the sloping sides of the grooves, and the form shown in Figure 3 causes deformation of the spring immediately on the occurrence of lateral movement. The deformation caused by lateral movement, of course, is in addition to that resulting from the vertical load.

Figures 4 through 6 further illustrate the resistance afforded by a cushion such as that of Figure 3 to lateral movement. Figure 4 shows substantially the same type of cushion illustrated in Figure 3 except that the radius of curvature of the seating grooves 17 of Figure 4 is greater than that of the groove 16 in Figure 3. On lateral movement of the upper bearing member 15 from the solid-line position to the dotted-line position, the spring rolls up the sides of the grooves in members 15, causing an increase in the deformation of the spring represented by the difference between its diameter in the initially-stressed condition designated 18 and the diameter to which it is compressed on lateral movement, indicated at 19. It is this increased deformation which tends to restore the upper bearing surface and the load to centered position relative to the support. The extent of lateral movement necessary to cause the deformation described is indicated by 20. The action of the cushion of Figure 2 is similar except that it permits a limited relatively free lateral movement between members 13'.

Figure 5 shows a construction similar to Figure 4 except that the radius of the seating grooves 21 is greater than that of the grooves 17. This permits a correspondingly greater degree of lateral movement, indicated at 22, with the same increase in the deformation of the spring 12.

Figure 6 shows a cushion having seating grooves 23 with a radius of curvature smaller than the grooves 17 in Figure 4. As a result, the lateral movement of the load necessary to effect the same increase in deformation of the spring as in Figures 4 and 5 is only the distance indicated at 24. In all three cases illustrated in Figures 4 through 6 there is rolling movement of the spring between the opposed bearing surfaces to the extent of one-half the travel of the load.

Figure 7 shows a further modification in which bearing members 25 have grooves 26 in their opposed faces which are V-shaped, at least in the portions thereof engaging the spring 12. Actually, the grooves 26 have round bottoms, as shown at 27, but the shape of this portion of the grooves is immaterial. The essential feature of the construction of Figure 7 is that each bearing member engages the spring turns at two points 28 instead of at substantially a single point, as in the case of the modifications previously described. This increases the capacity of the cushion by shortening the arc of the spring turn between the points at which corresponding portions of the grooves of the two bearing surfaces engage the turns. As a result, the bow-springs, i. e., the portions of the spring turns which deflect under load, are shorter and stiffer, being less than a half-circumference of the turn as in the cases described above.

Figures 8 and 9 show a further modification in which a load 29 is carried on a support 30 by a plurality of springs disposed at an angle, two such springs being illustrated at 31 and 32. The load and support have spring seating grooves 33. The load 29 has a sealing flange 34 attached thereto closing the space between it and the support to protect the springs against the entrance of foreign matter. The arrangement shown in Figure 9, of course, affords cushioning of vertical loads only but does not permit lateral movement of the load relative to the support.

It will be apparent that the cushion of my invention in the various forms illustrated and described is characterized by numerous advantages. In the first place, it provides a resilient cushion of large capacity which is very compact and employs relatively inexpensive springs. In addition, the cushion may be made to permit lateral movement of the load, with or without self-centering. The cushion of my invention is adaptable to a wide variety of industrial applications among which the following may be mentioned:

*a.* The isolation of rotating or reciprocating machinery to reduce the magnitude of oscillating forces transmitted to adjacent structures, such as from high speed punch presses; forming, coining, stamping and heading machines;

*b.* The reduction of impact blows onto foundations and the transmission of vibrations to surrounding processes and structures from reciprocating machinery, such as steam and board hammers, jolt-molding machines, forging presses, etc.;

*c.* The reduction of starting or shock forces or impacts within rotating or reciprocating machinery and equipment, such as in jaw or universal couplings, positive clutches, etc.; and d. The reduction of impact blows and vibrations in or by mobile equipment such as street railway cars, railroad passenger cars, cranes, etc., utilizing the invention to provide built-in resilience in the supporting wheels and structures.

The springs employed in the cushion of my invention may be formed from any suitable stock, i. e., round, square with round corners or flat, as desired. The two latter are preferable because they afford greater bearing area, thus reducing unit pressure at the points of contact with the seats on the bearing surfaces. These seats may be hardened by a flame or other treatment, to adapt them to withstand heavy pressures involved. The springs may be wound with a constant pitch or may have a reduced pitch with several turns at each end. The springs may be used straight or may be bent into an arc if the seating grooves in the bearing surfaces of the load and support happen to have such shape as in the case of car wheels. The springs may be made of corrosion-resistant wire where exposed to the elements in service.

Although I have illustrated and described several modifications of the resilient cushion of my invention, it will be recognized that changes in the details and arrangement illustrated may be made without departing from the spirit of the invention or the scope of the appended claims.

I claim:

1. In a resilient cushion for absorbing shock or vibration, a supporting member, a load-applying member spaced therefrom, alined grooves in the adjacent surfaces of said members, respectively, said grooves having flat sides substantially at right angles to each other, and a helical spring disposed between said members, seated in said grooves and engaging said sides.

2. In a resilient cushion for absorbing shock or vibration, a supporting member, a load-applying member spaced therefrom, alined grooves in the adjacent surfaces of said members, respectively, said grooves being V-shaped in cross-section with rounded bottoms, and a helical spring disposed between said members, seated in said grooves and engaging the sides of the grooves.

ARTHUR R. SCHULZE.

References Cited in the file of this patent

UNITED STATES PATENTS

| Number | Name | Date |
|---|---|---|
| 803,235 | Jordan | Oct. 31, 1905 |
| 814,077 | Prendergast | Mar. 6, 1906 |
| 1,154,912 | Drahonovsky | Sept. 28, 1915 |
| 1,460,869 | Thropp | July 3, 1923 |
| 1,865,457 | Cruz | July 5, 1932 |
| 2,154,275 | Tinn | Apr. 11, 1939 |
| 2,359,036 | Harper | Sept. 26, 1944 |
| 2,414,506 | Bowen | Jan. 21, 1947 |
| 2,525,730 | Schulze | Oct. 10, 1950 |
| 2,570,742 | Zeidler | Oct. 9, 1951 |

FOREIGN PATENTS

| Number | Country | Date |
|---|---|---|
| 575,839 | France | Apr. 30, 1924 |